United States Patent
Cann et al.

[11] Patent Number: 4,583,188
[45] Date of Patent: Apr. 15, 1986

[54] DIGITALLY CONTROLLED ELECTRONIC FUNCTION GENERATOR

[75] Inventors: Alfred J. Cann, Wilton; Bruce A. Ricker, Penacook, both of N.H.

[73] Assignee: Sanders Associates, Inc., Nashua, N.H.

[21] Appl. No.: 474,938

[22] Filed: Mar. 11, 1983

[51] Int. Cl.$^4$ ............................................... G06J 1/00
[52] U.S. Cl. .............................. 364/608; 340/347 DA; 340/347 M; 364/722
[58] Field of Search .............. 364/718, 719, 722, 607, 364/608; 340/347 AD, 347 DA, 347 C, 347 CC, 347 M

[56] References Cited

U.S. PATENT DOCUMENTS

| | | | |
|---|---|---|---|
| 3,939,459 | 2/1976 | Hoopes | 340/347 NT |
| 4,021,800 | 5/1977 | Katagiri et al. | 340/347 AD |
| 4,064,423 | 12/1977 | Atkisson, Jr. | 364/718 |
| 4,464,727 | 8/1984 | Parkes et al. | 364/608 X |
| 4,482,975 | 11/1984 | King et al. | 364/608 |

Primary Examiner—T. J. Sloyan
Attorney, Agent, or Firm—Louis Etlinger; David J. Thibodeau, Jr.

[57] ABSTRACT

A new method and apparatus for generating an analog output signal as a function of a digital input in the form of digital words over a specified range. The range is divided into a plurality of intervals, and the function is approximated by a linear segment in each interval. Each linear segment is defined by a step value, which is the value of the linear segment at the beginning the interval, and a slope value, which is the slope of the linear segment in the interval. The function is then approximated for any desired digital word in the range by determining the step and slope values for the interval into which the digital input signal falls, determining an incremental value by multiplying the slope value by the difference between the digital input signal and the value of the digital input signal at the beginning of the interval, and adding the incremental value to the step value.

9 Claims, 2 Drawing Figures

DIGITALLY CONTROLLED ELECTRONIC FUNCTION GENERATOR

The U.S. Government has rights in this invention pursuant to U.S. Navy Contract No. 62269-80-C-0808.

BACKGROUND OF THE INVENTION

1. Field of the Invention

The invention generally relates to a new and improved method and an electronic function generating apparatus for converting a digital input into an analog output signal, and finds particular use when the function relating the digital input to the analog output is non-linear.

2. Description of the Prior Art

Function generators for generating analog output signals as a function of digital inputs are widely used in the computer, automatic control, simulation and instrumentation arts, as well as in many other applications. For example, function generators are used in analog computers in many circumstances in which complicated potentiometer circuits have been used in the past. Function generators are used as they are simpler to adjust than the potentiometer circuits, and they generate a more readily reproducible analog output from a digital input, whereas in the potentiometer circuits the analog output signals, which are the result of manual adjustments, are not so readily reproducible.

Function generators often are required to generate an analog output signal that is related to a digital input by an arbitrary set of values. In some circumstances, the relation between the digital input, which normally is in the form of a digital word which comprises a plurality of bits, or binary digits, and which has a numerical value based on the coding of the bits, and the value of the analog output signal, which may be represented by a voltage, may be linear. For example, if the desired relationship between the analog output signal and the digital input is such that when the value of the digital input doubles, triples, and so forth, the voltage of the analog output signal doubles, triples, or follows accordingly, the desired relationship is linear. In this case, the function generator may comprise a digital to analog converter and the input may be constituted by digital words that cause the converter to generate the desired analog output signal.

In many instances, however, the relationship between the values of the digital input and the analog output signal, that is, the function to be generated by the function generator, is not linear, but instead is quite complicated. For example, a function generator may be required to follow the calibration curve of a physical device, such as a voltage-to-frequency curve of a voltage controlled oscillator or the resistance-to-temperature curve of a resistor whose resistance varies with temperature. In neither of these is the relationship linear. In such circumstances, a digital to analog converter alone normally cannot generate the desired output function, as the output of such a converter is usually a linear function of the input.

To solve the problem of forcing the function generator to match a non-linear function, an addressable memory can be connected between the digital input and the digital to analog converter. The memory stores, in addressable storage locations, digital words that cause the digital to analog converter to generate the desired analog output signal. The digital input is used to address the memory rather than as the input of the digital to analog converter. The digital word stored in the addressed location is then coupled to the input to the digital to analog converter, which generates an analog output signal based on the value of the digital word. The non-linearity of the function is effectively handled by the memory. However, if the non-linearity is severe, the number of memory words required in the memory may be quite large, which can increase the cost of the function generator. Furthermore, the number of digital bits in each word supplied by the memory to the digital to analog converter, which is a function of the "dynamic range" required of the digital to analog converter to generate the required function, can be considerably increased over the linear case.

Both of these factors, the increased number of digital words required to be stored in the memory and the number of digital bits required to be stored in each digital word can increase the cost of the memory used in the function generator. These factors also increase the cost of the digital to analog converter, which must be able to simultaneously accommodate all of the bits in each word which is required to enable the converter to accommodate the required range of analog output signals.

SUMMARY

It is therefore an object of the invention to provide a new and improved digitally controlled electronic function generator.

It is a further object of the invention to provide a new digitally controlled electronic function generator that generates an analog output signal as a non-linear function of the digital input, in which both the number of memory locations and the number of bits in each location in a memory that is provided to match the non-linearity of the function required to be generated is minimized.

It is another object of the invention to provide a new and improved method of generating an analog output signal as a function of a digital input.

It is yet another object to provide a new method of converting a digital input to an analog output signal, which accommodates non-linear conversion functions while minimizing the cost of apparatus used to perform the method.

In summary, the invention provides a new method and apparatus for generating an analog output signal as a function of a digital input. The range of the digital input that is to be accommodated by the function generator is divided into a plurality of intervals, and the function in each interval is approximated by a linear segment. Each linear segment is defined by a step, which is the value of the linear segment for the lowest value of the digital input in the interval, and a slope, or the rate of change of the linear segment over the interval.

The value of the function can then be approximated for any desired digital input by first determining the interval in which the digital input is located and the value of the step and slope for that interval. An incremental value is then generated by multiplying the slope value by the difference between the desired digital input and the value of the digital input at the beginning of the interval. The calculated incremental value is then added to the interval's step value to produce the value of the linear segment at the desired digital input, which is the approximate value of the function at that digital input.

The invention also provides a new apparatus for performing the method. The apparatus includes two portions, a first portion for generating a step value and a second portion for generating the incremental value. The digital input, which comprises a word having a selected number of digital bits, is divided into two parts, with the most significant bits identifying the interval, and the remainder, namely the least significant bits identifying the point in the interval at which the value of the function is to be determined.

The step value generating portion includes a memory connected to a digital to analog converter. The memory receives the most significant bits of the digital input and generates a digital word that is coupled to the digital to analog converter, causing it to generate an analog output signal having a value corresponding to the step value for that interval.

The incremental value generating portion of the new apparatus includes two sections, one section that determines the slope of the linear segment in that interval, and a second section that calculates the incremental value based on the slope and the difference between the value of the desired digital input and the value of the digital input at the beginning of the interval. The first section includes a memory and a digital to analog converter that receives the most significant bits of the digital input, which identify the interval. In response to the most significant bits, the memory couples digital signals to the digital to analog converter which cause it to generate an analog output signal having a value corresponding to the slope of the segment.

The analog output of the slope generating section is then coupled as an input signal to a second digital to analog converter, which also receives as input signals the least significant bits of the digital input. The least significant bits identify the point in the interval at which the value of the function is to be determined. In one specific embodiment, this second digital to analog converter is a multiplying digital to analog converter, which receives the analog signal corresponding to the interval's slope at a reference input. The multiplying digital to analog converter then generates an analog output signal corresponding to the value of the digital bits input to it multiplied by the analog signal at the reference input value. This product corresponds to the incremental value of the linear segment above or below the step value.

The step value, as determined by the step value generating portion, is then added to the incremental value, as calculated by the incremental value generating portion in a summer to produce an analog output signal that constitutes the value of the linear segment at the desired digital input, which approximates the value of the function at that digital input.

BRIEF DESCRIPTION OF THE DRAWINGS

This invention is pointed out with particularity in the appended claims. The above and further objects and advantages of this invention may be better understood by referring to the following description taken in conjunction with the accompanying drawings, in which:

DESCRIPTION OF AN ILLUSTRATIVE EMBODIMENT

Figure 1:
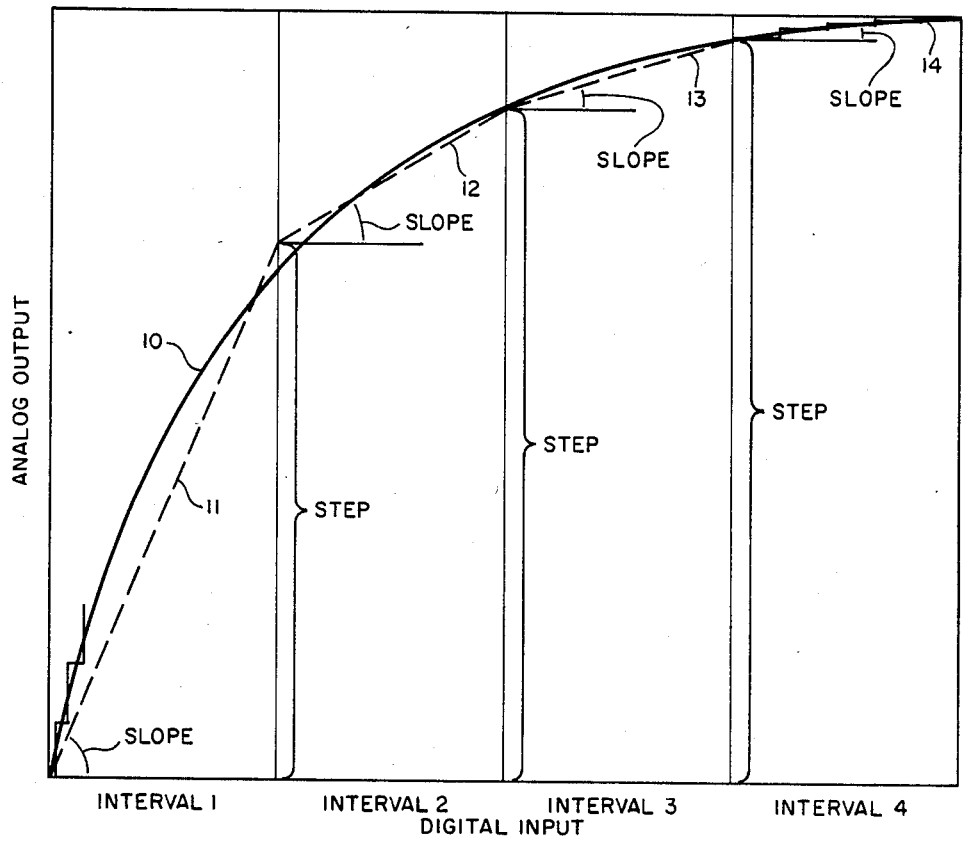
FIG. 1 is a diagram that is useful in understanding the new method.

By way of illustration of the new method, FIG. 1 depicts a function curve, shown in a solid line 10, that relates an analog output signal to a range of digital inputs. To take the aforementioned example of a voltage controlled oscillator, curve 10 may represent the oscillator's voltage-to-frequency curve, that is, it may represent the output frequencies of the oscillator as a function of a range of input voltages. The input voltage range is plotted along the horizontal axis, while output frequency is plotted along the vertical axis. If the curve 10 is intended to represent the voltage to frequency curve of an actual oscillator, the values of frequency and voltage for curve 10 would have to be determined by experiment or by calculations from circuit principles in a known manner.

After curve 10 has been determined, it is desired to have a digital to analog converter generate an analog output signal whose voltage is representative of the input voltage of the voltage controlled oscillator, in response to a digital input whose value is representative of the frequency output to the oscillator. The digital input comprises a digital word having a selected number of bits, and has a numerical value according to the encoding of the bits in the bit positions. The value of each digital word in this example corresponds to the desired output frequency of the voltage controlled oscillator. The value of the analog output signal from the function generator, on the other hand, would be represented by a voltage to be applied to the voltage controlled oscillator.

In performing the method, the range of the digital inputs representing oscillator frequency is divided into a plurality of intervals of equal length; four intervals are shown by way of example in FIG. 1. In each interval, the curve 10 is approximated by linear segments 11, 12, 13, and 14, which are shown in broken lines, that approximate the curve in the respective interval. For each interval, a step value is defined which is the value of the linear segment at the leftmost (as shown in FIG. 1) point in the interval. In addition to a step value, a slope value is also defined for each interval, which is the slope of the linear segment in that interval.

After the step and slope values have been defined, by use of the method one can determine the approximate value of the curve 10 for any desired digital input in any of the intervals. First, based on the desired digital input, the interval is identified and the step and slope values are determined. The difference between the desired digital input and the value of the digital input at the leftmost (as shown in FIG. 1), point in the interval is determined, and an incremental value is calculated by multiplying the slope by this difference. The incremental value is then added to the step value for that interval. This sum is the value of the linear segment for the desired digital input, which, in turn, is the approximate value of the function at that point.

In many cases the method gives a satisfactory approximation of the actual function. If a closer approximation is required, the number of intervals can be increased.

Figure 2:
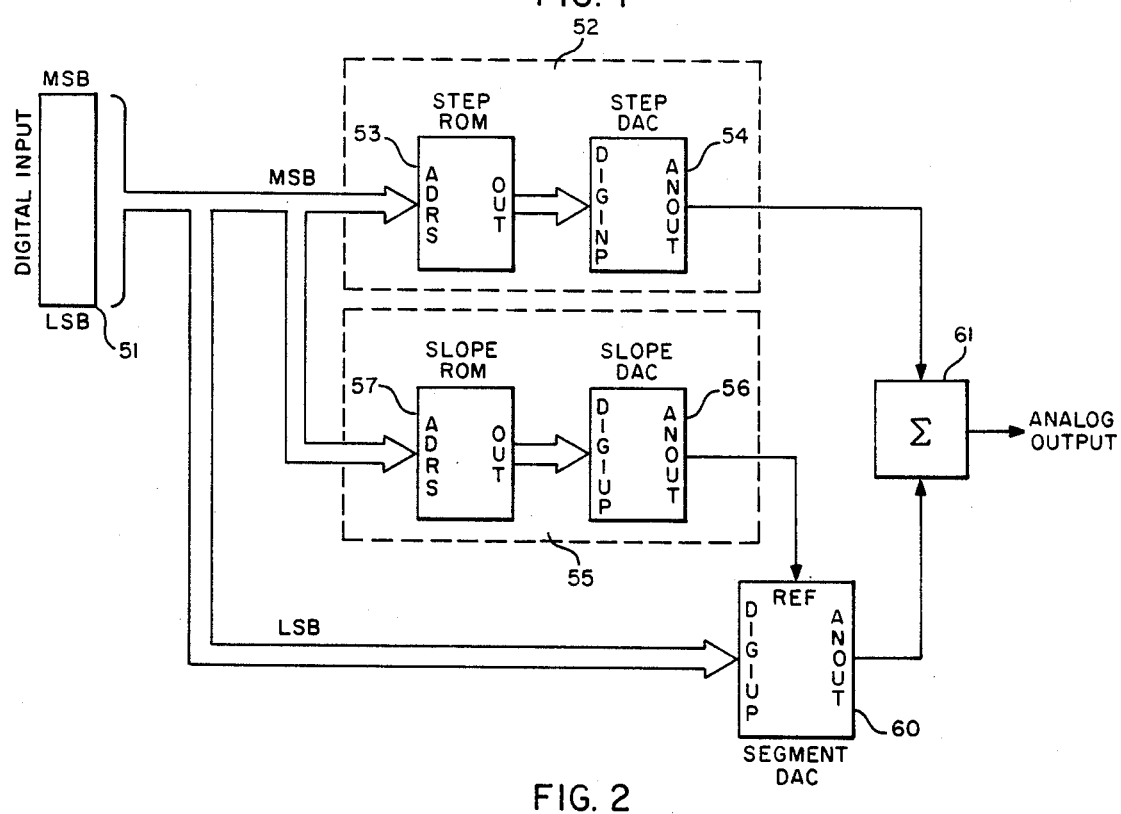
FIG. 2 depicts, in general block diagram form, a new function generator that is constructed in accordance with the invention.

FIG. 2 depicts, in general block diagram form, circuitry 50 that may be used to perform the method described above with respect to FIG. 1. With reference to FIG. 2, a digital input is provided from, for example, a register 51. As is conventional, the digital input comprises a digital word having a plurality of bits, or binary digits, that are coupled to the remainder of circuitry 50 in parallel. In some circumstances, the digital input may be provided to circuitry 50 serially rather than in parallel. In this situation, the register 51 may be constituted by a shift register which serially receives the digital bits, and converts them into parallel form for coupling to the remainder of circuitry 50.

The bits forming the digital input are divided into a first portion which constitutes the most significant bits, and a second portion comprising the remainder, or the least significant, bits. With reference to FIG. 1, the most significant bits identify the interval, whereas the least significant bits identify the position in the interval, that is, the difference between the value of the desired digital input and the value at the leftmost point (as shown in FIG. 1) of the interval. The bits constituting the most significant portion are coupled, over lines designated MSB, to a step signal generator 52 comprising a step read only memory (ROM) 53 and a step digital to analog converter 54. The step digital to analog converter generates an analog output signal in response to a digital signal from step read only memory 53 that constitutes the step value for the interval.

The purpose of the step read only memory 53 is as follows. Digital to analog converters normally generate analog output signals that are linear functions of the value of the digital word that is input to the converter. However, the variations in the step values generated by step signal generator 52 need not vary linearly with the intervals; in other words, the step value for the second interval need not be twice the step value for the first, and so forth. To accommodate this non-linearity, the step read only memory 53 has a plurality of storage locations each of which is associated with an interval. Each storage location contains a digital word that, when coupled to the step digital to analog converter 54, cause the converter to generate an analog output signal having a value that corresponds to the step value for that interval. The digital input, and specifically the most significant portion of the digital input from register 51, which identifies the interval, is used as the address for the step read only memory 53, to select the proper storage location for the interval. The digital to analog converter 54 thus generates an analog output signal that is a function of the digital word stored in the addressed location in step read only memory 53, rather than of the digital input from register 51.

Similarly, circuitry 50 includes a slope signal generator 55 comprising a slope digital to analog converter 56 and a slope read only memory 57 that also receives the most significant bits of the digital word from register 51 by way of the MSB lines. The slope digital to analog converter 56 generates an analog output signal constituting the slope of the linear segment in the interval. The slope read only memory 57 has the same function as step read only memory 53, namely, to couple a digital word that causes slope digital to analog converter 56 to generate the proper analog output signal, with the most significant bits from register 51 functioning as the address for slope read only memory 57.

The output signal from slope digital to analog converter 56 is coupled to the reference input of a segment digital to analog converter 60, which also receives the least significant bits of the digital word stored in register 51 on lines LSB. The segment digital to analog converter 60 is preferably a multiplying digital to analog converter, in which an analog signal received at a reference input terminal ("REF" in FIG. 2), modifies, in a multiplicative fashion, the analog output signal that would otherwise be generated in response to the digital input signal. Thus, the least significant bits of the digital word, which represent the difference between the value of the digital word stored in register 51 and the value at the beginning of the interval, are multiplied in segment digital to analog converter 60 by the interval's slope, which is generated by the slope digital to analog converter 56. The analog output signal generated by segment digital to analog converter 60 is an incremental value which, with reference again to FIG. 1, is the height above or below the step of the linear segment at that point in the interval. This incremental value from segment digital to analog converter 60 is then added to the step value generated by step digital to analog converter 54 in an analog summer 61 to provide an analog output signal which has a value corresponding to the value of the approximating linear segment at the desired digital input.

A benefit of the invention can be further illustrated by a specific design example. In this example, the input range is 4096 ($2^{12}$), which is divided into 32 ($2^5$) intervals. The maximum slope of the function over the entire range in the example is 4 ($2^2$) and the minimum slope is $\frac{1}{8}$ ($2^{-3}$). It should be noted that all of these assumed values are powers of two, which is solely for the purpose of simplifying calculations and is not required for the use of the method.

Under the prior art method, in which one memory and one digital to analog converter were used to accommodate nonlinear functions, the smallest resolvable difference in the value of the analog output signal is the input range divided by the minimum slope, or 32,768 ($2^{15}$), requiring a memory size equal to 32,768 words of 15 bits each. The memory thus requires fifteen bits to address each storage location, and the digital to analog converter also requires fifteen bits for its digital input.

In the method of this invention, the number of words required for each memory 53 and 57 is thirty-two, that is, the number of intervals, which thus requires five bits for the address. The number of bits in the words stored in the slope read only memory 57 is equal to, at most, the difference between the exponents of the maximum and minimum slopes, or five in this example. The memory 57 thus has thirty-two words having five bits per word, and digital to analog converter 56 is required to accommodate five bits for its digital input.

The number of bits required to control step digital to analog converter 54 is at most fifteen, the number required in the prior art method. However, in most cases the number of bits will be much less. Therefore, the number of bits in the words stored in the step read only memory 53 is also at most fifteen, and usually less.

Finally, the number of digital bits required to control segment digital to analog converter 60 is at most twelve (from the $2^{12}$, or 4096, of the input range) minus five (from the $2^5$, or thirty-two, intervals), or seven.

Therefore, the sizes of both memories 53 and 57 required for the new method, thirty-two words each having five bits per word in memory 57 and at most fifteen bits per word in memory 53, are considerably reduced from the size of the memory required in the prior art method, which requires a memory having 32,768 words each having fifteen bits.

The foregoing description is limited to a specific embodiment of this invention. It will be apparent, however, that this invention can be practiced in systems having diverse basic construction or in arrangements that use different internal circuitry than is described in this specification, with the attainment of some or all of the foregoing objects and advantages. Therefore, it is the object of the appended claims to cover all such variations and modifications as come within the true spirit and scope of this invention.

What is claimed as new and desired to be secured by Letters Patent of the United States is:

1. A method for generating an analog output signal in response to a digital input signal in the form of input digital words having values in a specified range, the analog output signal being a non-linear function of the digital input, comprising the steps of:

(a) approximating the non-linear function by dividing the range into a plurality of intervals, and approximating the function in each interval by a linear segment having an analog step value comprising the value of the linear segment at the beginning of each interval and an analog slope value comprising the rate of change of the linear segment over the interval;

(b) determining the interval for the digital input signal;

(c) generating the analog step value for the interval from the digital input signal;

(d) determining the analog slope value for the interval from the digital input signal;

(e) converting the slope value to an analog form slope signal;

(f) operating a multiplying digital to analog converter connected to receive as inputs the digital input signal, and the analog form slope signal thereby generating an incremental value in the form of an analog signal; and (g) adding the step value and the analog incremental value to form the analog output signal.

2. A method as defined in claim 1 in which the step values are a non-linear function of the intervals, and the step (c) of generating the analog step value for the interval further comprises the steps of:

(i) using the most significant portion of the input digital word to address a digital step memory to retrieve a digital step word; and (ii) converting the retrieved digital step word to the analog step signal.

3. A method as defined in claim 2 in which the slope values are a non-linear function of the intervals, the step (d) of determining the slope value for the interval further comprises the steps of:

(i) using the most significant portion of the input digital word to address a digital slope memory to retrieve a digital slope word; and (ii) converting the retrieved digital slope word to an analog signal comprising the slope value for the interval.

4. Apparatus for generating an analog output signal in response to a digital input in the form of an input digital word having a least significant portion and a most significant portion, the apparatus comprising:

(a) step digital to analog generating means adapted to receive the most significant portion of the input digital word for generating a step analog output signal in response thereto;

(b) slope generating means adapted to receive the most significant portion of the input digital word for generating an output slope signal representative of the rate of change of the analog output signal as a function of the change in digital input over a selected interval of the range of digital input including the input digital word, and (c) increment generating means adapted to receive the least significant portion of the input digital word and the output slope signai, for generating an incremental analog output signal proportional to the least significant portion of the input digital word multiplied by the output slope signal; and (d) analog summing means connected to the step digital to analog generating means and the increment digital to analog generating means, for summing the step anaog output signal and the incremental analog output signal to form the analog output signal.

5. Apparatus as defined in claim 3 in which the slope generating means comprises:

(i) digital slope memory means, having an address input and data output, adapted to receive the most significant portion of the input digital word at the address input, thereby generating a slope digital word at the data output; and (ii) slope digital to analog conversion means connected to receive the slope digital word, thereby generating the output slope signal in analog form.

6. Apparatus for generating an analog output signal in response to a digital input in the form of an input digital word having a least significant portion and a most significant portion, the apparatus comprising:

(a) step digital to analog generating means adapted to receive the most significant portion of the input digital word, for generating a step analog output signal in response thereto;

(b) slope generating means adapted to receive the most significant portion of the input digital word for generating a slope analog output signal representative of the rate of change of the analog output signal as a function of the change in digital input over a selected interval of the range of digital input including the input digital word, and (c) a multiplying digital to analog converter having a digital input adapted to receive the least significant portion of the input digital word and a reference input connected to receive the slope analog output signal from said slope generating means; for generating an incremental analog output signal, and;

(d) analog summing means connected to the step digital to analog generating means and the multiplying digital to analog converter, for summing the step analog output signal and the incremental analog output signal to form the analog output signal.

7. Apparatus as defined in claim 4 in which the step values are a non-linear function of the selected interval, and the step digitial to analog generating means comprises:

(i) digital step memory means, having an address input and data output, adapted to receive the most significant portion of the input digital word at the address input, thereby generating a step digital word at the data output; and (ii) step digital to analog conversion means connected to receive the step digital word, thereby generating the step analog output signal.

8. Apparatus as defined in claim 6 in which the slope values are a non-linear function of the selected interval, and the slope generating means comprises:

(i) a digital slope memory, having an address input and data output, adapted to receive the most significant portion of the input digital word at the address input, thereby generating a slope digital word at the data output; and (ii) a slope digital-to-analog converter connected to receive the slope digital word, thereby generating the slope analog output signal.

9. Apparatus as defined in claim 6 in which the step values are a non-linear function of the selected interval, and the step digital to analog generating means comprises:

(i) a digital step memory, having an address input and data output, adapted to receive the most significant portion of the input digital word at the address input, thereby generating a step digital word at the data output; and (ii) a step digital-to-analog converter connected to receive the step digital word, thereby generating the step output signal.

* * * * *